United States Patent
Wang (10) Patent No.: US 8,787,773 B2
(45) Date of Patent: Jul. 22, 2014

(54) ELECTRONIC DISPERSION CORRECTION CIRCUIT FOR OPTICAL TRANSMISSION SYSTEM

(75) Inventor: Jun Wang, Warrington, PA (US)

(73) Assignee: Motorola Mobility LLC, Libertyville, IL (US)

(*) Notice: Subject to any disclaimer, the term of this patent is extended or adjusted under 35 U.S.C. 154(b) by 42 days.

(21) Appl. No.: 13/467,389

(22) Filed: May 9, 2012

(65) Prior Publication Data
US 2013/0302039 A1  Nov. 14, 2013

(51) Int. Cl.
*H04B 10/50* (2013.01)

(52) U.S. Cl.
USPC ............... 398/194; 398/147; 398/193

(58) Field of Classification Search
CPC ....................................................... H04B 10/58
USPC ................... 398/193–194, 147, 159
See application file for complete search history.

(56) References Cited

U.S. PATENT DOCUMENTS

| | | | |
|---|---|---|---|
| 4,354,276 A | 10/1982 | Karakinis |
| 5,115,440 A | 5/1992 | Gysel |
| 5,146,192 A | 9/1992 | Kondo et al. |
| 5,302,922 A | 4/1994 | Heidemann et al. |
| 5,321,710 A | 6/1994 | Cornish |
| 5,378,937 A | 1/1995 | Heidemann et al. |
| 5,798,854 A | 8/1998 | Blauvelt et al. |
| 5,930,696 A | 7/1999 | Tzuang et al. |
| 6,107,877 A | 8/2000 | Miguelez et al. |
| 6,133,790 A | 10/2000 | Zhou |
| 6,288,814 B1 | 9/2001 | Blauvelt |
| 6,519,374 B1 | 2/2003 | Stook |
| 6,549,316 B2 | 4/2003 | Blauvelt |
| 6,577,177 B2 | 6/2003 | Zhou et al. |
| 6,587,243 B1 | 7/2003 | Zhou |
| 6,865,199 B2 | 3/2005 | Miguelez et al. |
| 6,985,020 B2 | 1/2006 | Zhou |
| 7,057,474 B2 | 6/2006 | Miller |
| 7,271,948 B1 | 9/2007 | Wang et al. |
| 7,606,502 B2 | 10/2009 | Zhou |
| 7,792,165 B2 | 9/2010 | Khalouf et al. |
| 7,809,282 B2 | 10/2010 | Zhou |
| 7,920,795 B2 | 4/2011 | Wang et al. |
| 2002/0063930 A1 | 5/2002 | Blauvelt |
| 2003/0015697 A1 | 1/2003 | Brophy et al. |
| 2003/0016415 A1 | 1/2003 | Jun |
| 2004/0056720 A1 | 3/2004 | Jansen et al. |
| 2007/0030087 A1 | 2/2007 | Perry et al. |
| 2007/0264027 A1 | 11/2007 | Zhou |
| 2007/0297803 A1 | 12/2007 | Peral |
| 2008/0292315 A1 | 11/2008 | Zhou |
| 2009/0245309 A1 | 10/2009 | Khalouf et al. |
| 2009/0310967 A1 | 12/2009 | Wang et al. |
| 2011/0150484 A1 | 6/2011 | Wang |
| 2011/0262144 A1 | 10/2011 | Ishaug |

OTHER PUBLICATIONS

United States Patent and Trademark Office, "Non-Final Rejection" for U.S. Appl. No. 13/467,353 dated Sep. 26, 2013, 6 pages.

*Primary Examiner* — Leslie Pascal (57) ABSTRACT

A dispersion correction circuit is provided for use with an input driving signal. The dispersion correction circuit includes an input portion an output portion and a filter portion. The input portion is arranged to receive the input driving signal. The output portion can output an output signal based on the input driving signal. The filter portion is disposed between the input portion and the output portion. The filter portion includes a first varactor, a DC bias portion, and a second varactor. The DC bias portion provides a DC bias to the first varactor. The first varactor is arranged in a first polarity direction, and the second varactor is arranged in a second polarity direction that is the same as the first direction.

20 Claims, 5 Drawing Sheets

ELECTRONIC DISPERSION CORRECTION CIRCUIT FOR OPTICAL TRANSMISSION SYSTEM

CROSS-REFERENCE TO RELATED APPLICATION

Related subject matter is disclosed in the following patent application, which is commonly owned and co-pending with the present application, and the entire contents of which are hereby incorporated by reference: U.S. application Ser. No. 13/467,353, filed herewith, entitled "ELECTRONIC DISPERSION CORRECTION CIRCUIT FOR OPTICAL TRANSMISSION SYSTEM".

BACKGROUND

In conventional Cable Television (CATV) transmission systems, the conventional technology trend is to transmit signals optically via 1550 nm. The selection of the 1550 nm wavelength window is due to a lower fiber attenuation loss than in other alternatives. Furthermore, the availability of optical amplifiers in the 1550 nm window enables configuring systems with longer lengths of optical communication waveguides. However, in the 1550 nm wavelength window, the dispersion associated with optical waveguides results in distorted signals. For example, the interaction of the laser chirp, a frequency increase or decrease over a period of time, and fiber dispersion produces huge second order distortion and associated noise in CATV transmission systems and results in the inability to provide a directly modulated laser over the past decade for optical communication systems. The current technology used for 1550 nm transmitters is external modulation (EM) using external modulators. Furthermore, external modulation using external modulators is expensive and complex.

Recent changes associated with CATV system requirements, for example, smaller number of analog channels and more Quadrature Amplitude Modulation (QAM) channels, and Distributed Feedback (DFB) laser improvement, for example, smaller laser chirp parameter and better laser linearity results in the capability to use directly modulated laser transmitters for transmission of CATV signals in the 1550 nm window with the aid of dispersion correction. Dispersion correction is needed to correct the distortion caused by fiber dispersion correction.

There are basically two types of dispersion correction technologies, one being optical dispersion correction and the other is electronic dispersion correction. Optical dispersion technologies are normally expensive and optically lossy. Some optical dispersion correction technologies may also incur signal degradations, such as filter band limitation and optical non-linearity. In contrast to optical dispersion correction, electronic dispersion technology does not suffer from the issues as described above. Furthermore, electronic dispersion correction is cheaper to implement than optical dispersion correction.

While conventional electronic dispersion correction technology has advantages over the optical one, which can include low cost, being optically lossless and tunable, it also has disadvantages, such as limitations associated with dispersion correction, with respect to limiting the number of analog channels capable of transmission and reduced transmission waveguide distance.

BRIEF SUMMARY OF THE DRAWINGS

The accompanying drawings, which are incorporated in and form a part of the specification, illustrate exemplary embodiments and, together with the description, serve to explain the principles thereof. In the drawings.

DETAILED DESCRIPTION

Improved systems and methods for dispersion correction are provided. Additional advantages and novel features are set forth in part in the description which follows, and in part will become apparent to those skilled in the art upon examination of the following, or may be learned by practice of an embodiment.

In accordance with embodiments, dispersion correction circuits are presented for improving dispersion correction associated with optical communication systems in, typically, CATV applications.

In accordance with an illustrative embodiment, a dispersion correction circuit is provided for use with an input driving signal. The dispersion correction circuit includes an input portion, an output portion, and a filter portion. The input portion is arranged to receive the input driving signal. The output portion can output an output signal based on the input driving signal. The filter portion is disposed between the input portion and the output portion. The filter portion includes a first varactor, a DC bias portion, and a second varactor. The DC bias portion provides a DC bias to the first varactor. In some embodiments, the filter portion includes an inductor. In further embodiments, the filter portion includes a second DC bias portion for providing a DC bias to the second varactor. The first varactor is arranged in a first direction, and the second varactor is arranged in a second direction, the same as the first direction.

Figure 1:
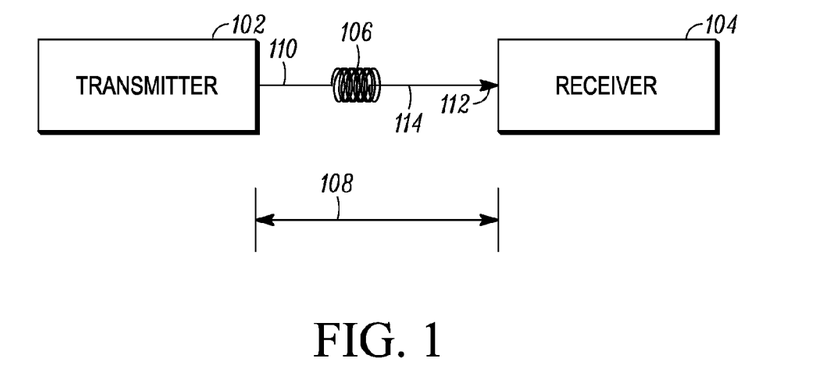
FIG. 1 is an example optical communication system, in accordance with an embodiment.

FIG. 1 is an example optical communication system 100, in accordance with an embodiment.

Optical communication system 100 includes a transmitter 102, a receiver 104, and an optical communication channel 106.

Transmitter 102 optically transmits information through optical communication channel 106 to receiver 104.

Non-limiting examples of configurations for optical communication channel 106 include optical waveguides and optical fibers.

Transmitter 102 and receiver 104 are separated by a distance 108. A signal transmitted by transmitter 102 exits transmitter 102 at a location 110 and is received by receiver 104 at a location 112. A location 114 represents the midway point between transmitter 102 and receiver 104.

In operation, information is transmitted by transmitter 102, information then traverses optical communication channel and is then received by receiver 104.

FIG. 1 is an example optical communication system where information is communicated from a transmitter to a receiver. Transmitter 102 will be described in further detail with reference to FIGS. 2-3 below.

Figure 2:
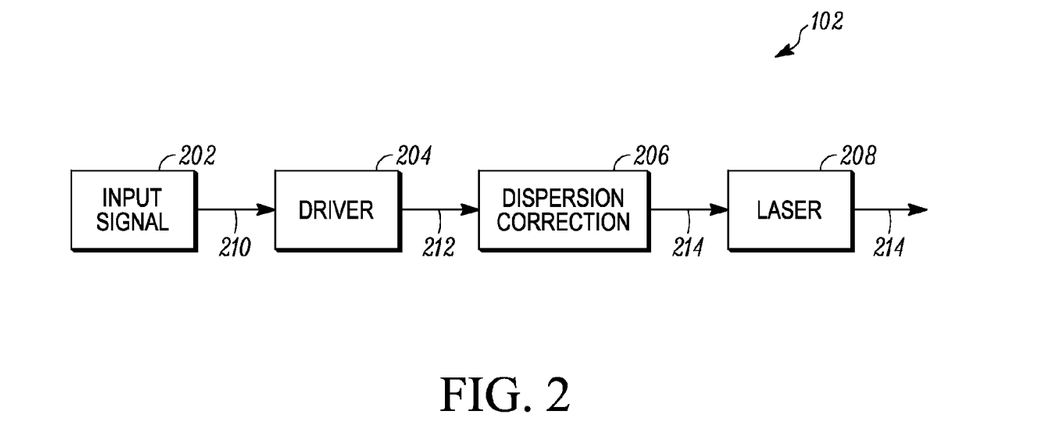
FIG. 2 illustrates a more detailed example transmitter as described with reference to FIG. 1, in accordance with an embodiment.

FIG. 2 illustrates in more detail example transmitter 102 as described with reference to FIG. 1, in accordance with an embodiment.

Transmitter 102 includes an input signal provider 202, a driving signal provider 204, a dispersion correction circuit 206 and a laser 208.

Driving signal provider 204 receives information from input signal provider 202 via a communication channel 210. Dispersion correction circuit 206 receives information from driving signal provider 204 via a signal 212. Laser 208 receives information from dispersion correction circuit 206 via a signal 214. Laser 208 provides information to external entities (not shown) via a communication channel 216.

Input signal provider 202 provides information for transmission to a receiver. Driving signal provider 204 receives and processes information such that it may be further processed for transmission. Dispersion correction circuit 206 receives information and processes the information for dispersion correction. Laser 208 receives information and generates a corresponding light signal.

FIG. 2 illustrates in more detail example the transmitter as described with reference to FIG. 1 where information is converted and processed for performing dispersion correction. Dispersion correction circuit 206 will be described in further detail with reference to FIG. 3.

Figure 3:
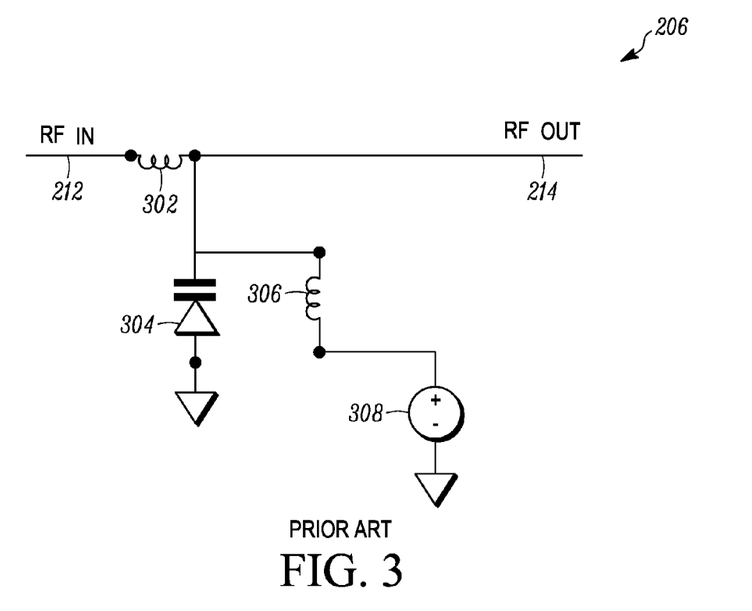
FIG. 3 is a schematic diagram of a conventional dispersion correction circuit.

FIG. 3 is a schematic diagram of conventional dispersion correction circuit 206 as described with reference to FIG. 2 for use in an optical communication system.

Dispersion correction circuit 206 includes an inductor 302, a varactor diode 304, an inductor 306 and a DC bias 308.

Signal 212 as noted as an RF in, connects to a first leg of inductor 302. A second leg of inductor 302 connects to a first leg of varactor diode 304, a first leg of inductor 306 and signal 214 noted as an RF out. A second leg of varactor diode 304 connects to ground. A second leg of inductor 306 to positive leg of DC bias 308. Negative leg of DC bias 308 connects to ground. Further, the polarity of varactor diode 304 can also be flipped depending on the nature of the chirp.

Dispersion correction circuit 206 is used with laser driver circuitry to provide correction. Without dispersion correction circuit 206, an optical transmitter will transmit optical signal over an optical fiber having a significant amount of dispersion. The dispersion interacting with the laser chirp degrades the performance of a communication system using especially a directly modulated laser. Dispersion correction circuit 206 alters the original electrical signal that is used to drive the laser into a modified signal for driving the laser. The modified signal for driving the laser reduces the amount of impact of fiber dispersion on the laser output, thereby improving performance.

Inductor 302 and varactor diode 304 function as a low pass filter. Signal 212 modifies the capacitance of varactor diode 304 and varies the associated delay for the low pass filter. The variable delay provided by the low pass filter provides dispersion correction. Inductor 306 is used to provide DC bias for varactor diode 304 and block Alternating Current (AC) or Radio Frequency (RF) signal. In some cases, an inductor and a varactor diode may be arranged to form an all-pass filter.

In order to achieve the largest amount of dispersion correction, varactor diode 304 is biased near zero volts as varactor diode 304 exhibits the largest amount of variable capacitance per change in voltage when biased near zero volts. However, biasing varactor diode 304 near zero volts incurs some perform degradations. For example, for a large signal swing with the bias near zero volts, the combined signal and DC bias can generate a positive voltage momentarily across varactor diode 304 such that varactor diode 304 is forward biased and conducts an electrical current. Furthermore, forward biasing and conducting electrical current for varactor diode 304 may generate signal distortion and/or noise. To avoid signal distortion and/or noise, varactor diode 304 may be configured further away from zero Volts, however, this reduces the amount of dispersion correction provided which reduces the length available for transmission distance 108. Additionally, the closer varactor diode 304 is biased to zero Volts, the less linear the Voltage to Capacitance relationship which also negatively affects dispersion correction.

FIG. 3 is a schematic diagram of a conventional dispersion correction circuit where biasing a varactor diode close to zero Volts, when a significant dispersion correction is needed, may cause distortion, noise and non-linear operation and biasing varactor diode further away from zero Volts, while reducing distortion, noise and non-linear operation, also reduces the amount of available dispersion correction.

Figure 4:
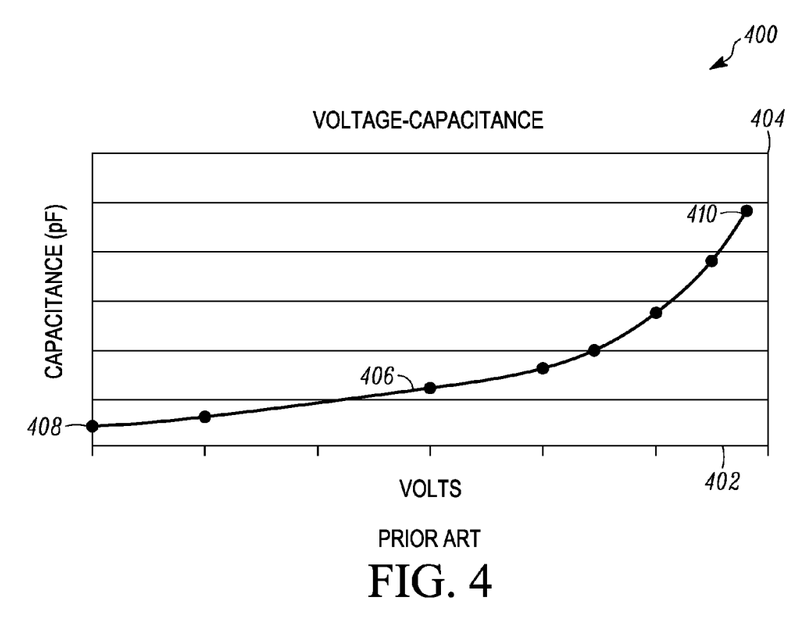
FIG. 4 is a schematic diagram of a conventional Voltage-Capacitance characteristic graph for a varactor diode.

FIG. 4 is a schematic diagram of a conventional Voltage-Capacitance characteristic graph 400 for a varactor diode. Voltage-Capacitance characteristic graph 400 presents Voltage-Capacitance characteristics for a varactor diode configured for a reverse bias.

Voltage-Capacitance characteristic graph 400 includes an x-axis 402 and a y-axis 404. X-axis 402 represents a voltage potential across a varactor diode in units of Volts and y-axis 404 represents the Capacitance exhibited by the varactor diode.

A line 406 initiates at a point 408 and increases exponentially to a point 410.

As illustrated, the capacitance versus voltage for a varactor is non-linear. Due to the non-linear capacitance versus voltage operation of the varactor, configuring a system with consistent operation over a large operating voltage is difficult using a varactor, causing some imperfect dispersion correction. Furthermore, the distance which information may be transferred between transmitter and receiver is restricted due to the limitation of the existing circuit.

As described previously with respect to FIG. 3, the closer the operation of varactor diode 304 is to the x-axis value of zero volts, the greater the amount of capacitance change per change of Voltage is realized which aids in dispersion correction associated with dispersion correction circuit 206. However, the operation of varactor diode 304 close to an x-axis value of zero volts may result in distortion, noise and/or non-linear operation. Furthermore, the closer the operation of varactor diode 304 is to x-axis value of −6 Volts, for example, the less Capacitance change per change in Voltage experienced. Furthermore, the closer the operation to an x-axis value of higher (negative) voltage, the less likelihood for distortion, noise and/or non-linear operation, but the amount of Capacitance change per unit of Voltage is dramatically reduced which reduces the amount of available dispersion correction provided by dispersion correction circuit 206 (FIGS. 2-3).

Figure 5:
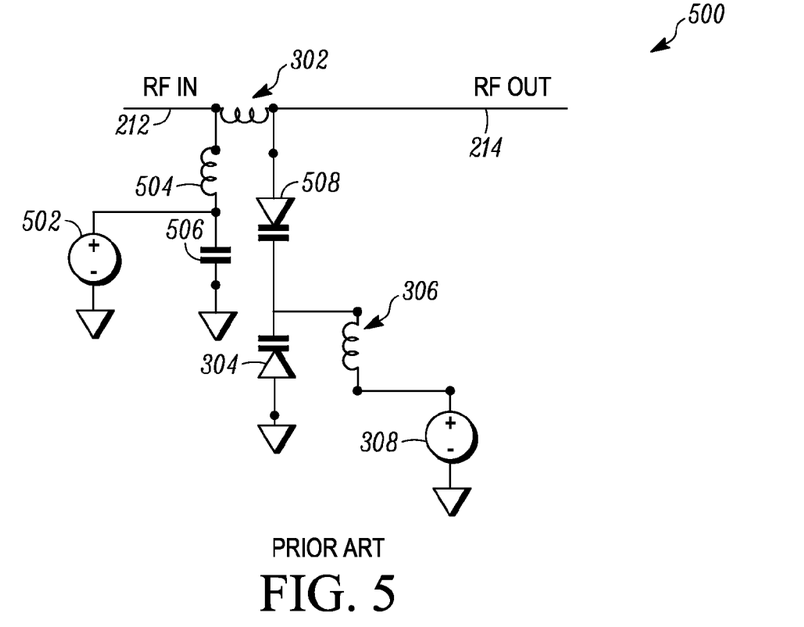
FIG. 5 is a schematic diagram of a conventional dispersion correction circuit.

FIG. 5 is a schematic diagram of another conventional dispersion correction circuit 500.

Dispersion correction circuit 500 includes inductor 302, varactor diode 304, inductor 306, DC bias 308, a DC bias 502, an inductor 504, a capacitor 506 and a varactor diode 508.

First leg of inductor 302 connects to a first leg of inductor 504 and signal 212. Second leg of inductor 504 connects to a positive leg of DC bias 502 and a first leg of capacitor 506. Negative leg of DC bias 502 connects to ground. A second leg of capacitor 506 connects to ground. Second leg of inductor 302 connects to a first leg of varactor diode 508 and to signal 214. Second leg of varactor diode 508 connects to first leg of varactor diode 304 and to first leg of inductor 306. Second leg of varactor diode 304 connects to ground. Second leg of inductor 306 connects to positive terminal of DC bias 308. Negative terminal of DC bias 308 connects to ground.

A low pass filter arrangement is provided via inductor 302, varactor 508 and varactor 304. Capacitor 506 in series with inductor 504 and DC bias 502 and inductor 306 and DC bias 308 provide the DC bias for varactor 508 and varactor 302. Varactor diode 304 is in series with varactor diode 508. Inductor 302 is the low pass filter inductance. Varactor diode 508 and varactor diode 304 may be identical varactors but biased at different bias voltages. Capacitor 506 operates as decoupling capacitance. Inductor 504 and inductor 306 function as RF block inductances used for isolating the DC bias from the RF circuit. Varactor diode 304 and 508 are connected such that under the RF voltage swing, the capacitor changes of the varactors are in the different directions.

When varactor diode 508 is biased more negative than varactor diode 304, the capacitance value of varactor diode 508 is less than the capacitance value of varactor diode 304 and vice versa.

In operation, when signal 212 transitions from a positive voltage to a negative voltage, it results in an increase in the capacitance of varactor diode 508. Furthermore, the capacitance of varactor diode 304 is reduced. A reduction in the RF voltage for varactor diode 508 is enhanced by varactor diode 304. The effects of capacitance changes for varactor diode 508 and varactor diode 304 and voltage reduction for varactor diode 508 and varactor diode 304 improve the linearity of the capacitance change as compared to dispersion correction circuit 206 as described with reference to FIGS. 2-3.

Since varactor diode 304 and varactor diode 508 are configured with opposite polarities, the capacitance generated by the varactor diodes are inverse. The opposing configuration results in delay time cancellation between the varactor diodes. The approach of dispersion correction circuit 500 is appropriate for use in applications where the needed dispersion correction is low in nature. As a non-limiting example, dispersion correction circuit 500 may be appropriate for applications associated with externally modulated laser transmitters where the modulator residual chirp is small.

FIG. 5 is a schematic diagram of a conventional dispersion correction circuit with improved linearity as compared to the circuit described with reference to FIG. 3.

Figure 6:
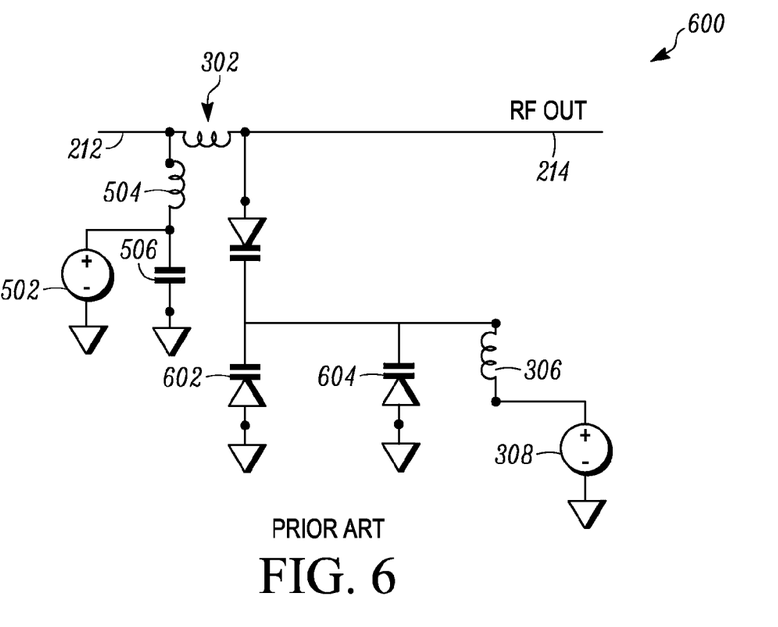
FIG. 6 is a schematic diagram of a conventional dispersion correction circuit.

FIG. 6 is a schematic diagram of another conventional dispersion correction circuit 600.

Dispersion correction circuit 600 includes inductor 302, inductor 306, DC bias 308, DC bias 502, inductor 504, capacitor 506, varactor diode 508, a varactor diode 602 and a varactor diode 604.

Dispersion correction circuit 600 is similar to dispersion correction circuit 500 (FIG. 5) with varactor diode 304 replaced with varactor diode 602 and varactor diode 604 in parallel.

The parallel configuration of varactor diode 602 with varactor diode 604 results in modification in the behavior of the circuit for increased linear operation and increased dispersion correction resulting in increased performance. Furthermore, the increased linear operation, increased dispersion correction and increased performance may be realized when varactor diode 508 and varactor diode 602/varactor diode 604 are configured with a similar bias which may not be the case for other circuit configurations. Furthermore, the parallel configuration provides increased flexibility for tuning the operation of the circuit associated with correction.

FIG. 6 is a schematic diagram of a conventional dispersion correction circuit where linearity is increased, dispersion correction is increased and performance is increased.

The following discussion and related equations explain the operation of dispersion correction circuit 206 described with reference to FIGS. 2-3, dispersion correction circuit 500 described with reference to FIG. 5 and dispersion correction circuit 600 described with reference to FIG. 5.

The capacitance of a varactor diode at any voltage may be expressed by Equation (1) shown below:

$$C(v) = C_{j0}(1 - V/V_{bi})^{-\gamma} = C_{j1}(V_{bi} - V)^{-\gamma} \quad (1)$$

where $C_{j1} = C_{j0}(V_{bi})^{-\gamma}$  (2)

The parameter $C(v)$ represents the varactor capacitance with respect to a voltage v. $C_{j0}$ represents the varactor diode capacitance at zero voltage. The parameter $\gamma$ is associated with the doping profile for the varactor diode. As non-limiting examples, $\gamma = 0.5$ may represent an abrupt junction and $\gamma = 1$ may represent a hyper-abrupt junction.

The group delay for the delay compensating network as described with reference to FIG. 3 may be given by Equation (3):

$$T_{gd} = (L_{402} C(v))^{1/2} \quad (3)$$

Using small signal approximation Equation (4) may be derived as shown below:

$$\delta T_{gd} = \frac{1}{2} \left( \frac{L_{402}}{C(v)} \right)^{1/2} \delta C = \frac{1}{2} T_{gd} \frac{\delta C}{C} \quad (4)$$

For the circuit as described with reference to FIG. 5, the total capacitance of the varactor diodes may be given by Equation (5) as shown below:

$$C_{total} = C_{404} * C_{608} / (C_{404} + C_{608}) \quad (5)$$

where $C_{404}$ and $C_{608}$ represent the capacitance of varactor diode 304 and varactor diode 508, respectively.

From the small approximation Equation (6) can be derived as:

$$\frac{\delta C_{total}}{C_{total}} \approx \frac{\delta C_{404}}{C_{404}} - \frac{\delta C_{608}}{C_{608}} \quad (6)$$

It is noted that Equation (4) and Equation (6) are presented in commonly assigned U.S. Pat. No. 7,809,282, in a slightly different form.

For dispersion correction circuit 600 as described with reference to FIG. 5 Equation (7) can be derived as:

$$\frac{\delta C_{total}}{C_{total}} \approx 2 \frac{\delta C_{702\_704}}{C_{702\_704}} - \frac{\delta C_{608}}{C_{608}} \quad (7)$$

For Equation (7), varactor diode 602 and varactor diode 604 are configured with the same capacitance as varactor diode 508.

Equation (6) and Equation (7) illustrate the cancellation of the two delay deltas between the varactor diodes of opposite polarity configuration. However, since the voltage drop is shared across the parallel components of varactor diode 602 and varactor diode 604, the linearity of the associated with the varactor diodes is improved which improves dispersion correction.

Embodiments will now be described in detail with reference to FIGS. 7-9.

Figure 7:
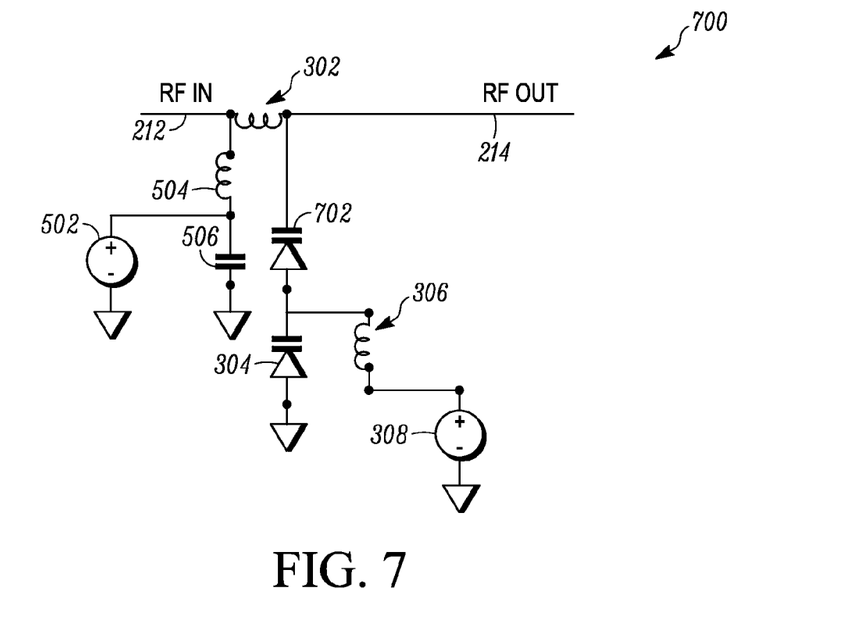
FIG. 7 is a schematic diagram of a dispersion correction circuit, in accordance with an embodiment.

FIG. 7 is a schematic diagram of a dispersion correction circuit 700, in accordance with an embodiment.

Dispersion correction circuit 700 includes inductor 302, varactor diode 304, inductor 306, DC bias 308, DC bias 502, inductor 504, capacitor 506 and a varactor diode 702.

Dispersion correction circuit 700 is similar to dispersion correction circuit 500 as described with reference to FIG. 5 with varactor diode 508 replaced with varactor diode 702. The polarity of varactor diode 702 is inverted as compared to varactor diode 508. Furthermore, varactor diode 304 and varactor diode 702 are configured with the same polarity orientation.

Dispersion correction circuit 700 improves Voltage-to-Capacitance linearity over dispersion correction circuit 206 while maintaining a similar dispersion correction capability without resulting in positive varactor diode bias.

FIG. 7 is a schematic diagram of a dispersion correction circuit where a varactor diode as described with reference to FIG. 5 is replaced with a varactor diode in an inverted polarity. Further discussion with respect to FIG. 7 is presented in the paragraphs below.

Figure 8:
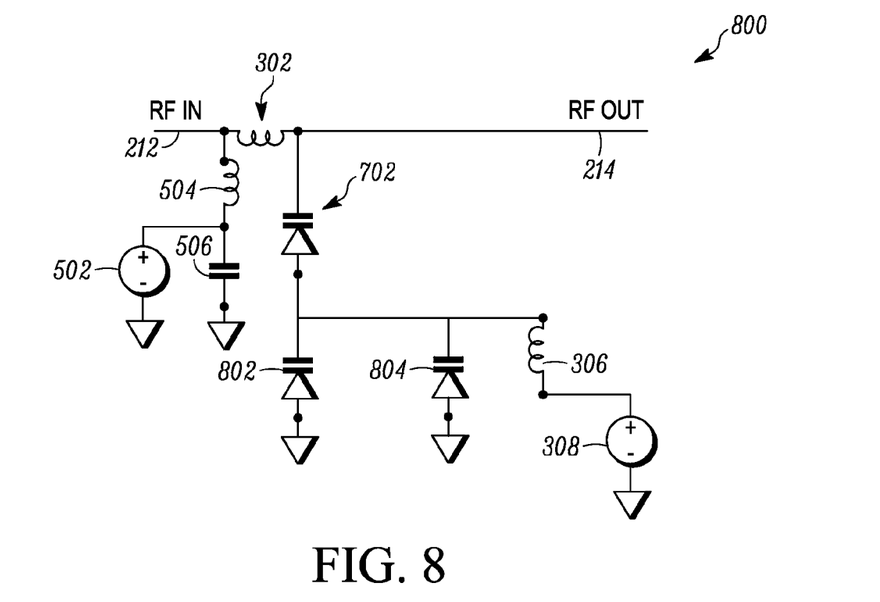
FIG. 8 is a schematic diagram of a dispersion correction circuit, in accordance with an embodiment.

FIG. 8 is a schematic diagram of a dispersion correction circuit 800, in accordance with an embodiment.

Dispersion correction circuit 800 includes inductor 302, varactor diode 304, inductor 306, DC bias 308, DC bias 502, inductor 504, capacitor 506, a varactor diode 802 and a varactor diode 804.

Dispersion correction circuit 800 is similar to dispersion correction circuit 700 as described with reference to FIG. 7 with varactor diode 304 replaced with varactor diode 802 and varactor diode 804 configured in parallel. Varactor diode 802 and varactor diode 804 are configured with the same polarity orientation as varactor diode 304 as described with reference to FIG. 7.

FIG. 8 is a schematic diagram of a dispersion correction circuit where a varactor diode as described with reference to FIG. 7 is replaced with a varactor diode in parallel. Further discussion with respect to FIG. 8 is presented in the paragraphs below.

The following discussion and related equations explain the operation of dispersion correction circuit 700 described with reference to FIG. 7 and dispersion correction circuit 800 described with reference to FIG. 8.

Using small signal approximation Equation (8) shown below can be derived for FIG. 7 as:

$$\frac{\delta C_{total}}{C_{total}} \approx \frac{\delta C_{404}}{C_{404}} + \frac{\delta C_{802}}{C_{802}} \quad (8)$$

Furthermore, using small signal approximation Equation (9) shown below can be derived for FIG. 8 as:

$$\frac{\delta C_{total}}{C_{total}} \approx 2\frac{\delta C_{902\_904}}{C_{902\_904}} + \frac{\delta C_{802}}{C_{802}} \quad (9)$$

Comparing Equation (6) and Equation (7) with Equation (8) and Equation (9) it can be observed that instead of canceling the delay time delta between the varactor diodes, the approach as described with reference to FIG. 7 and FIG. 8 adds the time deltas and therefore increase dispersion correction capability as opposed to FIG. 5 and FIG. 5 where a subtraction of time deltas is realized.

The circuits in FIG. 7 and FIG. 8 enable the configuration of the bias voltages of DC bias 308 and DC bias 502 which provides modification of the ratio of the voltage drop across the varactor diodes and aids in shaping the respective dispersion correction.

For a special case for FIG. 7 where the voltages of DC bias 502 noted as $V_{602}$ and DC bias 308 noted as $V_{408}$ satisfy the relation of $V_{602}=2*V_{408}$, then $C_{408}=C_{602}$. Furthermore, Equation (10) may be derived as:

$$\frac{\delta C_{total}}{C_{total}} \approx 2\frac{\delta C_{404}}{C_{404}} = 2\frac{\delta C_{802}}{C_{802}} \quad (10)$$

Even though the voltage is equally divided between the two varactor diodes which results in the δC of the varactor diodes to be reduced by half, the total dispersion correction capability is still maintained as indicated by Equation (10). Since the swing of the voltage applied across the varactor diodes is reduced b half, the linearity of the varactor diodes may be improved or the bias of the varactor diodes may be configured closer to zero volts in order to provide larger dispersion correction capability. The previous argument may also be applied to FIG. 8. Furthermore, the parallel cascade varactor diodes (e.g. varactor diode 802 and varactor diode 804) may be configured with various implementations in order to provide a variety of dispersion correction.

Figure 9:
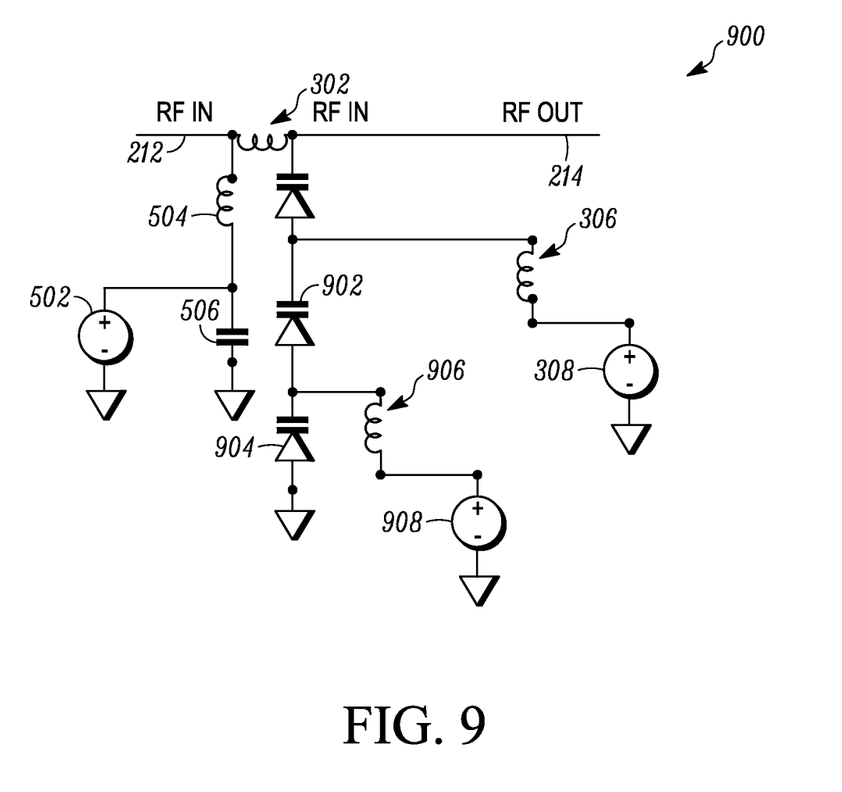
FIG. 9 is a schematic diagram of a dispersion correction circuit, in accordance with an embodiment.

FIG. 9 is a schematic diagram of a dispersion correction circuit 900, in accordance with an embodiment.

Dispersion correction circuit 900 includes inductor 302, a varactor diode 702, inductor 306, DC bias 308, DC bias 502, inductor 504, capacitor 506, a varactor diode 902, a varactor diode 904, an inductor 906 and a DC bias 908.

Dispersion correction circuit 900 is similar to dispersion correction circuit 700 as described with reference to FIG. 7 with varactor diode 304 replaced with varactor diode 902, varactor diode 904, inductor 906 and DC bias 908. Varactor diode 902 and varactor diode 904 are configured with the same polarity orientation as varactor diode 702. The cathode of varactor diode 902 connects to the anode of varactor diode 702 and first leg of inductor 306. The cathode of varactor diode 904 connects to the anode of varactor diode 902 and to a first leg of inductor 906. The anode of varactor diode 904 connects to ground potential. The second leg of inductor 906 connects to the positive terminal of DC bias 908. The negative terminal of DC bias 908 connects to ground potential.

The configuration of dispersion correction circuit 900 enables the segmentation of the correction capability into three portions. Each portion is associated with a smaller voltage differential which increases the linearity of dispersion correction circuit 900 as compared to dispersion correction circuit 700. Furthermore, the increase in the linearity decreases the associated dispersion which improves the performance.

DC bias 502 and DC bias 308 provide the voltage bias for varactor diode 702. DC bias 308 and DC bias 908 provide the voltage bias for varactor diode 902. DC bias 908 provides the voltage bias for varactor diode 904.

The cascade concept of dispersion correction circuit 900 can be expanded to an n-order cascade circuit for continued improvement in linearity resulting in decreased dispersion and improved performance. Likewise, the cascade concept illustrated by dispersion correction circuit 900 may also be applied to dispersion correction circuit 800 as described with reference to FIG. 8 where varactor diode 802, varactor diode 804, inductor 306 and DC bias 308 may be cascaded to an n-order circuit for improved linearity, decreased dispersion and improved performance.

The circuits illustrated with reference to FIGS. 7-9 are configured for low-pass operation. The improvement associated with linearity as described with reference to FIGS. 7-9 may also be applied to all-pass filters via replacement of inductor 302 with a center-tapped inductor. Furthermore, inductor 302 may also be replaced with two inductors to form the equivalent of a center-tapped inductor.

The anode/cathode orientation of the varactor diodes described with reference to FIGS. 7-9 may be inverted for some embodiments in order to invert correction.

FIG. 9 is a schematic diagram of a dispersion correction circuit where a cascade of varactor diodes with associated inductors and DC bias are configured for increasing the linear operation as compared to the circuit as described with reference to FIG. 7.

A dispersion correction circuit has been described which replaces a varactor diode of a conventional dispersion correction circuit with a varactor diode with an inverted orientation in order to improve dispersion correction capability. Furthermore, the dispersion correction circuit referenced in the previous sentence may replace a varactor diode with parallel varactor diodes in order to further modify and improve dispersion correction capability.

The foregoing description of various embodiments has been presented for purposes of illustration and description. It is not intended to be exhaustive or to limit embodiments to the precise forms disclosed, and obviously many modifications and variations are possible in light of the above teaching. It is intended that the scope be defined by the claims appended hereto.

What is claimed is:

1. A dispersion correction circuit for use with an input driving signal, the dispersion correction circuit comprising:
an input portion arranged to receive the input driving signal;
an output portion operable to output an output signal based on the input driving signal; and
a filter portion disposed between the input portion and the output portion,
wherein the filter portion includes a first varactor, a DC bias portion, and a second varactor,
wherein the DC bias portion provides a DC bias to the first varactor,
wherein the first varactor is arranged in a polarity direction, and
wherein the second varactor is arranged in the polarity direction, an anode of the first varactor being connected to a cathode of the second varactor.

2. The dispersion correction circuit of claim 1, wherein the DC bias portion includes a first inductor.

3. The dispersion correction circuit of claim 2, wherein the filter portion includes a third varactor arranged in parallel with one of the first varactor and the second varactor.

4. The dispersion correction circuit of claim 2, wherein the filter portion includes a second DC bias portion, a capacitor and an inductor.

5. The dispersion correction circuit of claim 1, wherein the filter portion includes a third varactor arranged in parallel with one of the first varactor and the second varactor.

6. The dispersion correction circuit of claim 5, wherein the input portion includes a second DC bias portion, a capacitor and an inductor.

7. The dispersion correction circuit of claim 1, wherein the input portion includes a second DC bias portion, a capacitor and an inductor.

8. An optical transmission system comprising:
a driver operable to provide an input signal;
a dispersion correction circuit operable to generate an electrical output signal, the dispersion correction circuit including an input portion, an output portion and a filter portion; and
a laser operable to output an optical signal based on the electrical output signal,
wherein the input portion is arranged to receive the input signal,
wherein the output portion is operable to output an output signal based on the input signal, and
wherein the filter portion is disposed between the input portion and the output portion,
wherein the filter portion includes a first varactor, a DC bias portion and a second varactor,
wherein the DC bias portion provides a DC bias to the first varactor,
wherein the first varactor is arranged in a polarity direction, and
wherein the second varactor is arranged in the polarity direction, an anode of the first varactor being connected to a cathode of the second varactor.

9. The optical transmission system of claim 8, wherein the DC bias portion includes an inductor.

10. The optical transmission system of claim 9, wherein the filter portion includes a third varactor arranged in parallel with one of the first varactor and the second varactor.

11. The optical transmission system of claim 9, wherein the filter portion includes a second DC bias portion, a capacitor, and a second inductor.

12. The optical transmission system of claim 8, wherein the filter portion includes a third varactor arranged in parallel with one of the first varactor and the second varactor.

13. The optical transmission system of claim 12, wherein the input portion includes a second DC bias portion, a capacitor and an inductor.

14. The optical transmission system of claim 8, wherein the input portion includes a second DC bias portion, a capacitor and an inductor.

15. A method of compensating for dispersion associated with an input driving signal, the method comprising:
receiving, via an input portion, the input driving signal;
filtering, via a filter portion, the input driving signal;
outputting, via an output portion, an output signal based on the filtered input driving signal; and
wherein the filter portion includes a first varactor, a DC bias portion and a second varactor,
wherein the DC bias portion provides a DC bias to the first varactor,
wherein the first varactor is arranged in a polarity direction, and
wherein the second varactor is arranged in the polarity direction, an anode of the first varactor being connected to a cathode of the second varactor.

16. The method of claim 15, wherein the filtering, via a filter portion, the input driving signal comprises: filtering with the DC bias portion, wherein the DC bias portion includes an inductor.

17. The method of claim 16, wherein the filtering, via a filter portion, the input driving signal comprises: filtering with a third varactor arranged in parallel with one of the first varactor and the second varactor.

18. The method of claim 15, wherein the filtering, via a filtering portion, the input driving signal comprises: filtering the input driving signal via a filter portion that includes a second DC bias portion, a capacitor and an inductor.

19. The method of claim 15, wherein the filtering, via a filter portion, the input driving signal comprises: filtering with a third varactor arranged in parallel with one of the first varactor and the second varactor.

20. The method of claim 19, wherein the receiving, via an input portion, the input driving signal comprises: receiving the input driving signal via an input portion that includes a second DC bias portion, a capacitor and an inductor.

* * * * *